US011288108B2

(12) United States Patent
Parravicini et al.

(10) Patent No.: US 11,288,108 B2
(45) Date of Patent: Mar. 29, 2022

(54) AUTOMATIC OUT-OF-BOUND ACCESS PREVENTION IN GPU KERNELS EXECUTED IN A MANAGED ENVIRONMENT (71) Applicant: ORACLE INTERNATIONAL CORPORATION, Redwood Shores, CA (US)

(72) Inventors: Alberto Parravicini, Lesmo (IT); Davide Bartolini, Obersiggenthal (CH); Lukas Stadler, Linz (AT); Arnaud Delamare, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 294 days.

(21) Appl. No.: 16/701,797

(22) Filed: Dec. 3, 2019

(65) Prior Publication Data
US 2021/0165699 A1 Jun. 3, 2021

(51) Int. Cl.
*G06F 9/54* (2006.01)
*G06F 9/455* (2018.01)
(Continued)

(52) U.S. Cl.
CPC .............. *G06F 9/544* (2013.01); *G06F 8/451* (2013.01); *G06F 9/30058* (2013.01);
(Continued)

(58) Field of Classification Search
None
See application file for complete search history.

(56) References Cited

U.S. PATENT DOCUMENTS

2011/0035736 A1* 2/2011 Stefansson ............ G06F 9/5072
717/149
2011/0035737 A1* 2/2011 Stefansson ................ G06T 1/20
717/149
(Continued)

OTHER PUBLICATIONS

Fumero et al., "Justin-time Gpu Compilation for Interpreted Languages with Partial Evaluation", In ACM SIGPLAN Notices, dated 2017, vol. 52. ACM, pp. 6073.
(Continued)

*Primary Examiner* — Qing Chen
(74) *Attorney, Agent, or Firm* — Hickman Becker Bingham Ledesma LLP (57) ABSTRACT

Techniques are provided for an automated method of adding out-of-bound access prevention in GPU kernels executed in a managed environment. In an embodiment, a system of computers compiles a GPU kernel code function that includes one or more array references that are memory address dependent. The system of computers compiles the kernel code function by generating a rewritten GPU kernel code module that includes, within the function signature of the rewritten GPU kernel code module, a respective array size parameter for each array reference of the one or more array references included in the GPU kernel code function. The system of computers further compiles the kernel code function by adding bounding protection instructions to the one or more potential out-of-bound access instructions in the rewritten GPU kernel code module. The potential out-of-bound access instructions comprise instructions that reference each respective array size parameter of the one or more array references. Afterwards, the rewritten GPU kernel code module is loaded in a virtual machine. Loading the rewritten GPU kernel code module in the virtual machine comprises modifying a host application to automatically transmit, from the host application, one or more input array size values. The
(Continued)

one or more input array size values is referenced by the one or more potential out-of-bound-access instructions.

20 Claims, 6 Drawing Sheets

(51) Int. Cl.
| | |
|---|---|
| *G06F 9/30* | (2018.01) |
| *G06F 8/41* | (2018.01) |
| *G06F 15/80* | (2006.01) |
| *G06F 9/38* | (2018.01) |

(52) U.S. Cl.
CPC ........ *G06F 9/3806* (2013.01); *G06F 9/45558* (2013.01); *G06F 15/8023* (2013.01); *G06F 2009/45583* (2013.01); *G06F 2009/45591* (2013.01)

(56) References Cited

U.S. PATENT DOCUMENTS

| | | | | |
|---|---|---|---|---|
| 2012/0204154 A1* | 8/2012 | Li | ................. | G06F 11/3684 717/124 |
| 2014/0063027 A1* | 3/2014 | Becker | ................ | G06F 9/505 345/520 |

OTHER PUBLICATIONS

Abadi et al., ". Tensorflow: A System for Large-scale Machine Learning". In 12th {USENIX}\ Symposium on Operating Systems Design and Implementation dated 2016, 21 pages.
https://llvm.org, "The LLWM Compiler Infrastructure", last viewed on Dec. 3, 2019, 3 pages.
https://joern.io/docs, "Joern Documentation" Platform for C/CC+ Code Analysis Based on Code Property Graphs, last viewed on Dec. 3, 2019, 3 pages.
https://docs.nvidia.com/cuda/cuda-memcheck/index.html, "CUDA-Memcheck: CUDA Toolkit Documentation", last updated Nov. 28, 2019, 1 page.
Higham, "Gaussian elimination. Wiley Interdisciplinary Reviews: Computational Statistics", 3, 3 dated (2011), pp. 230-238.
Harish et al., "Accelerating Large Graph Algorithms on the GPU Using CUDA", In International conference on high-performance computing. Springer, dated 2007 pp. 197-208.
Grauer-Gray et al., "Accelerating financial applications on the GPU",Proceedings of the 6th Workshop on General Purpose Processor Using Graphics Processing Units. Dated 2013, ACM, pp. 127-136.
Klockner et al., "PyCUDA: GPU run-time Code Generation for High-performance Computing". Arxiv preprint arXiv 911 dated (2009), 19 pages.
GITHUB, "gpu-rodinia/hotspot.cu at master", https://github.com/yuhc/gpu-rodinia/blob/master/cuda/hotspot/hotspot.cu, last viewed on Dec. 9, 2019, 8 pages.
Kuo et al., "GPU Acceleration for General Conservation Equations and its Application to Several Engineering Problems", Computers & Fluids 45, dated (2011), pp. 147-154.
Erb et al., . "Dynamic buffer overflow detection for GPGPUs." 2017 IEEE/ACM International Symposium on Code Generation and Optimization (CGO). IEEE, 2017, 49 pages.
Duboscq et al. "Graal IR: An extensible Declarative Intermediate Representation". In Proceedings of the Asia-Pacific Programming Languages and Compilers Workshop, dated 2013, 9 pgs.
Che et al., "Rodinia: A Benchmark Suite for Heterogeneous Computing", In 2009 IEEE international symposium on workload characterization (IISWC). IEEE, pp. 44-54.

Che et al., "A Characterization of the Rodinia Benchmark Suite with Comparison to Contemporary CMP Workloads" In IEEE International Symposium on Workload Characterization dated 2010, IEEE, pp. 1-11.
Bunch et al., "Triangular factorization and inversion by Fast Matrix Multiplication". Math. Comp. 28, 125 (1974), pp. 231-236.
Bartlett, Peter, "Introduction to Time Series Analysis". Lecture 5, dated 2014, 34 pages.
Alur et al., "GPUDrano: Detecting Uncoalesced Sccesses in GPU Programs", In International Conference on Computer Aided Verification. Springer, dated 2017 pp. 507-525.
GRAALVM, "High-Performance Polyglot VM", https://www.graalvm.org/, last viewed on Dec. 3, 2019, 6 pages.
Needleman et al., "A General M<ethod Applicable to the Search for Similarities in the Amino Acid Sequence of Two Proteins". Journal of molecular biology 48, 3 (1970), pp. 443-453.
Wurthinger et al., "One VM to Rule Them AH". In Proceedings of the 2013 ACM international symposium on New ideas, new paradigms, and reflections on programming & software. ACM, 2013, pp. 187-204.
Wu et al., "Gpucc: An Open-source GPGPU Compiler", In Proceedings of the 2016 International Symposium on Code Generation and Optimization. Dated 2012, ACM, pp. 105-116.
Wimmer et al., "Truffle: A self-optimizing Runtime System" In Proceedings of the 3rd annual conference on Systems, programming, and applications: software for humanity. ACM, dated 2012,pp. 13-14.
Stone et al., "OpenCL: A Parallel Programming Standard for Heterogeneous Computing Systems", Computing in science & engineering 12, dated (2010), 8 pages.
Sintorn et al., "Fast Parallel GPU-sorting Using a Hybrid Algorithm". J. Parallel and Distrib. Comput. 68, 10 (2008), pp. 1381-1388.
Sanders et al., "CUDA by Example: an Introduction to General-purpose GPU Programming", Addison-Wesley Professional, dated 2010, 311 pages.
Page et et al. "The PageRank Citation Ranking: Bringing Order to the Web", Technical Report. Stanford InfoLab, dated 1999, 17 pages.
Huang et al., "HotSpot: A Compact Thermal Modeling Methodology for Early-stage VLSI Design", IEEE Transactions on Very Large Scale Integration (VLSI) Systems 14, 5 dated (2006), pp. 501-513.
Negrut et al, "Unified Memory in CUDA 6.0: A Brief Overview of Related Data Access and Transfer Issues". Tech. Rep. TR-2014-09, University of Wisconsin—Madison, dated 2014, 13 pages.
Yamaguchi et al., "Modeling and Discovering Vulnerabilities with Code Property Graphs" In 2014 IEEE Symposium on Security and Privacy. Dated 2014, IEEE, pp. 590-604.
Mitchell et al. "Machine Learning, Burr Ridge", IL: McGraw Hill 45, 37 dated (1997), pp. 870-877.
Miele, Andrea. "Buffer overflow vulnerabilities in CUDA: a preliminary analysis." Journal of Computer Virology and Hacking Techniques 12.2 (2016), pp. 113-120.
Mark Harris et al. [n. d.]. "Optimizing parallel reduction in CUDA". NVDIA Developer Technology, Apr. 14, 2016, 21 pages.
LLVM, "Clang: A C Language Family Frontend for LLVM", https://clang.llvm.org/, last viewed on Dec. 3, 2019, 2 pages.
Lattner, "LLVM: A Compilation Framework for Lifelong Program Analysis & Transformation", Proceedings of the international symposium on Code generation and optimization, IEEE, May 17, 2008, 33pgs.
Lattner, Chris, "LLVM and Clang: Next Generation Compiler Technology", In the BSD conference, vol. 5., dated 2005, 11 pages.
Landaverde et al., "An investigation of Unified Memory Access Performance in Cuda", In 2014 IEEE High Performance Extreme Computing Conference (HPEC). Dated 2014, IEEE, pp. 1-6.
NVIDIA, "Security Bulletin: NVIDIA GPU Display Driver", dated Aug. 2019, https://nivida.custhelp.com/app/answers/detail, last viewed on Dec. 3, 2019, 4 pages.

* cited by examiner

300
Generating a new signature comprising the list of parameters from the signature of the original GPU kernel source code

302
For each parameter in the new signature, determining whether the parameter is an array

304
In response to determining that a parameter is an array, adding one or more parameters to the signature to hold the size of the corresponding array

306
Compiling the modified GPU kernel source code to executable binary code

308
Replacing any references to the original GPU kernel source code with the new GPU source code

310
Copying and placing the content of the original GPU kernel source code into the bew GPU kernel source code

312
Removing the original GPU source code and any references to the original GPU source code

400
Parsing and mapping the parameters in the signature of the GPU kernel source to associate each input array to the parameter that represents its size

↓

402
Performing a linear scan to iterate over all instructions within the GPU kernel source code to find potential out-of-bound input array access instructions

↓

404
For each instruction, determining if the instruction comprises any aliases to input arrays or input array sizes

↓

406
For each instruction, determining if the instruction is an address computation instruction

↓

408
Inspecting all identified potential out-of-bound input array access instructions and filtering all input array access instructions which already have a valid boundary check

↓

410
Performing optimizations of the GPU kernel source code by merging a plurality of potential out-of-bound input array access instructions into a single input array access instruction

↓

412
Adding out-of bound boundary checks to all identified potential out-of-bound input array access instructions

AUTOMATIC OUT-OF-BOUND ACCESS PREVENTION IN GPU KERNELS EXECUTED IN A MANAGED ENVIRONMENT

TECHNICAL FIELD

The present disclosure relates to graphics processing unit (GPU) optimization. More specifically, the disclosure relates to automatic out-of-bound access prevention in GPU kernels.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

GPUs have proven extremely effective at accelerating general purpose workloads in areas such as numerical simulation, deep learning, artificial intelligence, engineering, and finance, thanks to the computing power GPUs offer and the ability to process large amounts of data in parallel. GPU programming, however, is inherently more complex than traditional CPU (central processing unit) architecture as it requires an understanding of the underlying GPU processors and memory architecture. Thus, GPU programming may be more error-prone and difficult to debug. Out-of-bound array accesses (accesses to a non-existent position in an array) in GPU kernels is one of the most common sources of errors and vulnerabilities on GPUs and can be hard to detect and prevent.

Out-of-bounds array accesses can pose a variety of problems, such as unexpectedly ending or altering the program execution, and be a major security vulnerability. Out-of-bounds array accesses on GPUs can be challenging to detect, as they do not usually stop the execution. Moreover, numerical results might be unaffected by these accesses, leaving programmers with a false sense of security over the robustness of their code. This behavior limits the adoption of GPUs in the acceleration of critical workloads that might benefit from the computational power GPUs offers, such as in financial applications.

Prevention, or mitigation, of out-of-bounds array accesses has been investigated for years. Detecting out-of-bounds accesses through static program analysis (examining the source code of a program, without actually executing the program itself) is known to have limited effect because, in Turing complete programming languages, the problem is equivalent to the Halting Problem. Existing techniques rely on heuristics that provide limited guarantees on the detection, or the prevention, of out-of-bounds array accesses. Tools such as JOERN can be used to identify array accesses through static program analysis, but they cannot modify the existing code to offer protection against out-of-bounds accesses. Another technique consists in running the desired application in a sandboxed environment, so that a malicious actor that is able to exploit out-of-bounds accesses would not be able to take control of the machine executing the code. This approach doesn't actually prevent out-of-bounds accesses but is used to mitigate their effects. Out-of-bounds access still occur, meaning that the application might still provide wrong results or interrupt its execution unexpectedly.

NVIDIA offers a tool called CUDA-MEMCHECK that can run the provided executable in a controlled debugging environment and is able to detect out-of-bound accesses whenever they occur. Preventing and fixing those accesses, however, must be done by the end-user, and no automation is offered. Moreover, out-of-bound accesses could occur depending on the provided input, meaning that CUDA-MEMCHECK is unable to give guarantees that all the out-of-bound accesses that are possible in a program are actually found.

Therefore, there is a need for a solution to automatically detect and modify existing code to offer protection against out-of-bound accesses in GPUs.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

General Overview

Techniques are provided for an automated method of adding out-of-bound access prevention in GPU kernels executed in a managed environment. In an embodiment, a system of computers compiles a GPU kernel code function that includes one or more array references that are memory address dependent. The system of computers compiles the kernel code function by generating a rewritten GPU kernel code module that includes, within the function signature of the rewritten GPU kernel code module, a respective array size parameter for each array reference of the one or more array references included in the GPU kernel code function.

A function signature may include a name of the function, the data types of the return value of function, arguments and parameters of the function, and the argument names. A function signature is specified by instructions or code that define the function. The system of computers further compiles the kernel code function by adding bounding protection instructions to the one or more potential out-of-bound access instructions in the rewritten GPU kernel code module. The potential out-of-bound access instructions comprise instructions that reference each respective array size parameter of the one or more array references. Afterwards, the rewritten GPU kernel code module is loaded in a virtual machine. Loading the rewritten GPU kernel code module in the virtual machine comprises modifying a host application to automatically transmit, from the host application, one or more input array size values. The one or more input array size values are referenced by the one or more potential out-of-bound-access instructions.

The collection of data items processed by the GPU is referred to herein as an array. Techniques described herein may use static analysis to automatically identify input array accesses in GPU kernels and to modify the original GPU kernel source code to include input array parameters and protections that prevent out-of-bound input array accesses. Prior to modification, the GPU kernel source code may be transformed into Low Level Virtual Machine (LLVM) Intermediate Representation (IR) by a compiler. IR is a representation of source code which is similar to the machine code that is used to execute the code. The LLVM toolchain is a set of technologies designed around a language independent IR that serves as a portable, high-level assembly language that can be optimized with a variety of transformations over multiple passes. The modified GPU kernel source code may then be compiled ahead-of-time and integrated within a runtime execution environment to transparently provide information about the array sizes when executing the GPU kernel source code at runtime.

GPU Overview

Figure 1:
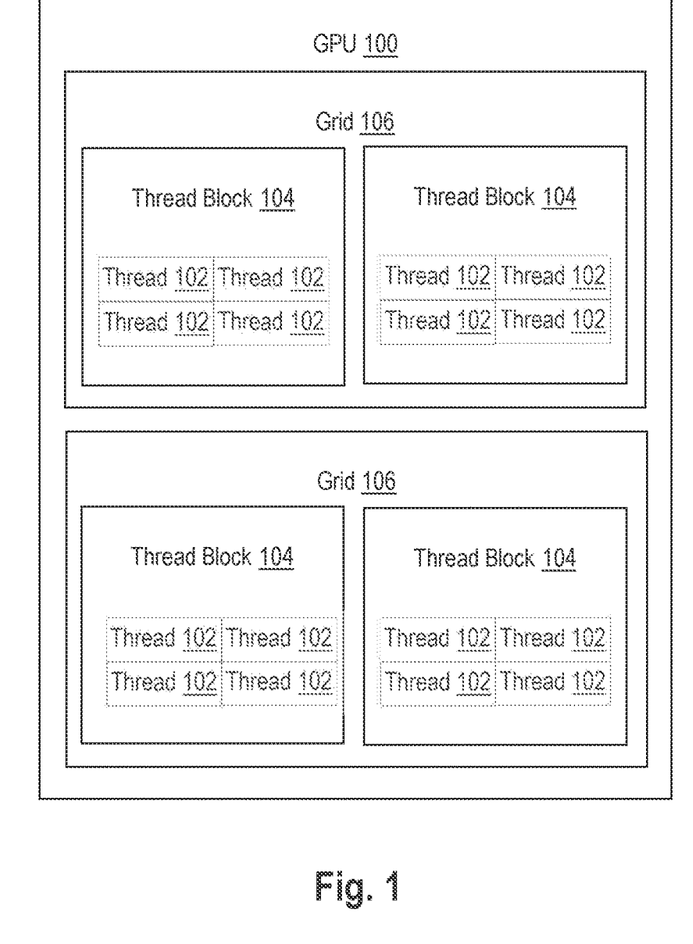
FIG. 1 is a block diagram of an example graphics processing unit (GPU) architecture.

FIG. 1 is a block diagram of an example graphics processing unit (GPU) architecture.

A GPU 100 is a specialized electronic circuit designed to rapidly manipulate and alter memory to accelerate the creation of images in a frame buffer intended for output to a display device. GPUs 100 are able to process large amounts of data in parallel fashion by running computational GPU kernels on each data item that must be processed.

The Compute Unified Device Architecture (CUDA) language is a specialized programming language, developed by NVIDIA, which allows users to use a CUDA-enabled GPU 100 for general purpose processing. The CUDA platform is a software layer that gives direct access to the GPU's 100 virtual instruction set and parallel computational elements for the execution of GPU kernels. A CUDA application may be divided into two main sections: 1) host source code which runs on CPU, and 2) device source code which runs on GPU 100. The host source code may be used to initialize the GPU 100, while the device source code may be used to provide a set of GPU kernels callable from the host source code.

The architecture of a GPU 100 comprises of a number of threads 102. The threads are organized into n-dimensional thread blocks 104, which are then organized into n-dimensional grids 106. Each thread 102 executes a GPU kernel on a single data item.

To compute the results of a GPU kernel, the CUDA runtime may spawn a number of threads 102 at least equal to the number of data items in input arrays. However, the number of threads 102 spawned may be larger than the number of data items in input arrays due to architectural constraints of the GPU 100. The computation is divided into equally sized thread 104 blocks, and the size of each thread block 104 is dependent on the underlying GPU 100 hardware. For example, if a user decides to have 128 threads 102 per thread block 104, and it has to process an input array of 1000 data elements, it will be necessary to create ⌈1000/128⌉=8 thread blocks 104, for a total of 128·8=1024 threads 102. As the number of threads 102 is larger than the size of the input array, out-of-bound input array accesses will occur for accesses greater than 1000. The CUDA runtime might not report any error, as the accesses have been performed on global memory. The result of the computation will seem to be correct, if the values of the output array are not directly affected by out-of-bound values. However, these out-of-bound input array accesses may be a security vulnerability. In case of more complex GPU kernels, out-of-bound input array accesses may lead to interrupted executions or incorrect computations. For these reasons, it is critical to have a mechanism to prevent out-of-bound input array accesses.

Polyglot Virtual Machine Overview

In computing, a virtual machine (VM), is an emulation of a computer system. VMs are based on architectures and provide functionalities of a physical computer. For example, a VM is capable of providing functionalities of CPUs and GPUs.

A polyglot VM is a VM that is capable of running application in many different programming languages. For example, GraalVM, a polyglot VM developed by ORACLE, is capable of running applications in many different programming languages, including JavaScript, Python, Ruby, R, Java, C, C++, and grCUDA. grCUDA is a CUDA-binding language that allows existing GPU kernels to be invoked in GraalVM using a host language, such as Python.

System Overview for Automatic GPU Out-of-Bound Access Prevention

Figure 2:
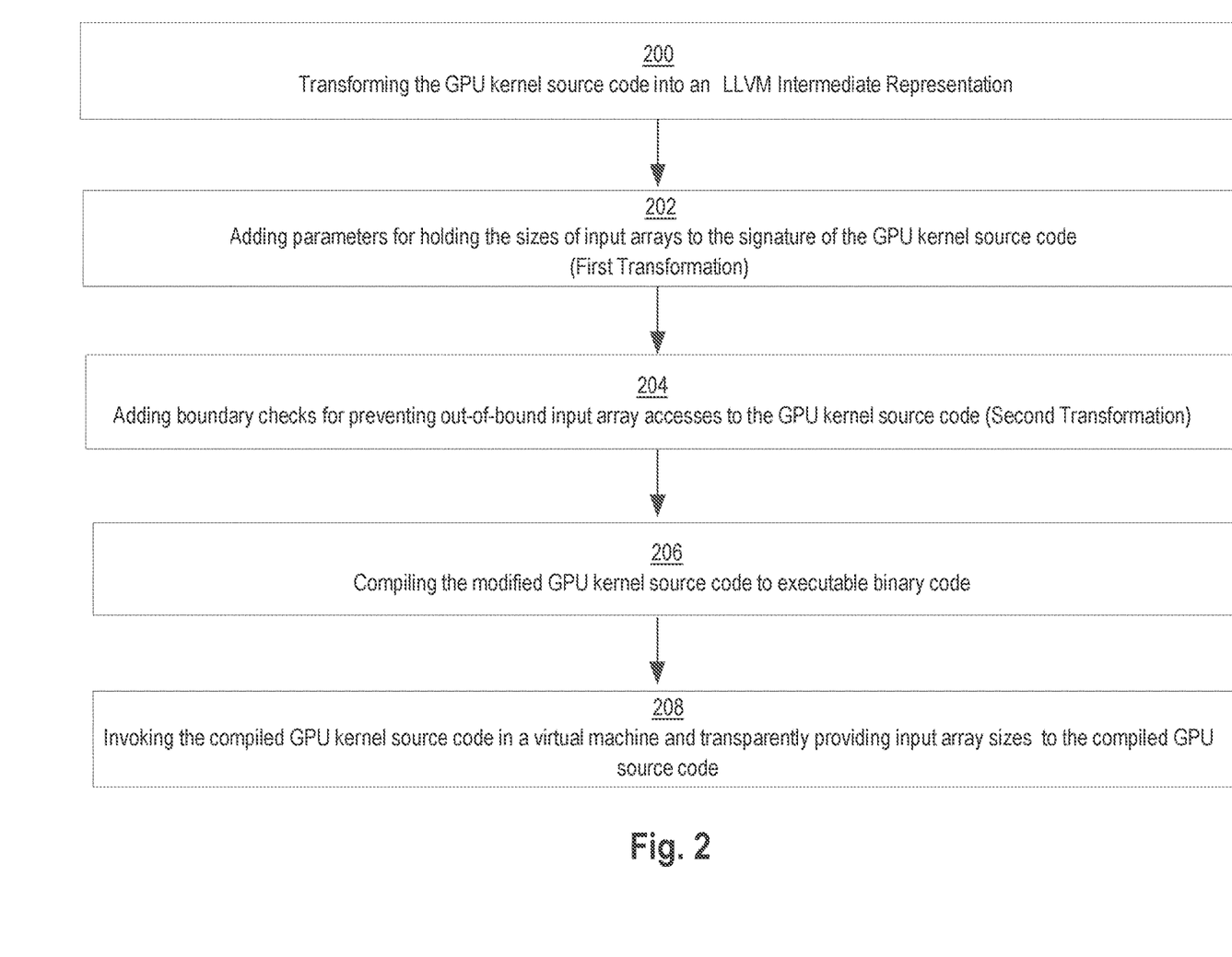
FIG. 2 illustrates an example flow diagram of a system for automatic out-of-bound prevention in GPU kernels in a managed environment, according to one embodiment.

FIG. 2 illustrates an example flow diagram of a system for of automatic out-of-bound prevention in GPU kernels in a managed environment.

In this example system, the GPU kernel source code is provided to the system. At step 200, the GPU kernel source code may be transformed into an LLVM IR by a compiler. Alternatively, the GPU kernel source code may remain in native GPU code, such as CUDA code, or be expressed in other object-oriented programming languages, such as C++. The GPU kernel source code is described in further detail in section: GPU KERNEL SOURCE CODE, below.

Adding out-of-bound access protections to the GPU kernel source code requires the inclusion of the references to the sizes of input arrays that are accessed in the GPU kernel source code. At step 202, the GPU kernel source code may undergo a first transformation to add one or more parameters to hold the sizes of input arrays that are accessed in the GPU kernel source code. The sizes of input arrays that are accessed may be specified by automatically modifying the GPU kernel source code signature to hold one or more additional parameters that reference the size each input array. In an example implementation, the GPU kernel source code signature is a list of input parameters. This step is further illustrated in FIG. 3, and in section: FIRST TRANSFORMATION—ADDING INPUT ARRAY SIZE REFERENCES, below.

After modifying the GPU kernel source code to include references to input array sizes, the GPU kernel source code may undergo a second transformation to insert out-of-bound access protections. At step 204, out-of-bound access protections may be automatically added to the GPU kernel source code in the form of boundary checks for potential out-of-bound input array accesses. For example, instructions within the GPU kernel source code that are between the start boundary and the end boundary of input array accesses may be embodied inside conditional blocks that are executed only if the indices used to access the input arrays lie in the valid sizes of the input arrays. This step is further illustrated in FIG. 4, and in section: SECOND TRANSFORMATION—INSERTING BOUNDARY CHECKS, below.

At step 206, after obtaining a modified GPU kernel source code, the system may compile the modified GPU kernel source code to executable binary code. In some embodiments, the modified GPU kernel source is compiled first into assembly code based on the target architecture of the GPU.

The executable binary code of the GPU kernel source code may then be loaded inside a polyglot VM. At step 208, within a polyglot VM, the GPU kernel source code may be invoked by loading and calling the GPU kernel using a host application based on host source code in a host language. Input array sizes may be transparently provided to the GPU kernel. This step is further illustrated in section: INVOKING THE GPU KERNEL IN A POLYGLOT VIRTUAL MACHINE, below.

GPU Kernel Source Code

The starting point of the system for of automatic out-of-bound prevention in GPU kernels in a managed environment is obtaining the source code of the GPU kernel. In an embodiment, the GPU kernel source code is assumed to be provided to the system, however, no assumption is made about the structure of the GPU kernel source code. In other embodiments, the GPU kernel source code is retrieved using additional steps performed by the system.

TABLE 1

Example of GPU kernel source code.

```
void axpy(float *x, float *y, float a, float *res) {
    int i = gpu_dependent_id( );
    res[i] = a * x[i] + y[i];
}
```

Table 1 illustrates an example of a simplified GPU kernel source code that is provided to the system. In this example, *x, *y, and *res are references to input arrays containing one or more data items to be processed by the GPU. gpu_dependent_id( ) represents a value which is dependent on a thread identifier. The thread identifier may be used to identify the thread that is being executed by the GPU and to retrieve data items that the GPU kernel must process. Thus, in some embodiments, gpu_dependent_id( ) may represent a GPU-dependent index associated with the total number of threads being executed. Architectural constraints of the GPU may, in some instances, result in the total number of threads being executed to be greater than the number of data items to be processed. For example, in Table 1 above, if index i, representing the value of gpu_dependent_id ( ), is greater than the number of data items in any of the arrays referenced by *x, *y, or *r e s, then an out-of-bound input array access may occur. For this reason, the current system may automatically add out-of-bound prevention in the form of boundary checks to ensure that the computation performed by the GPU is correct.

The example of the simplified GPU kernel source code in Table 1 is represented in CUDA code. The GPU kernel source code may also be expressed in other object-oriented programming languages, such as C++. In some embodiments, however, the GPU kernel source code is transformed into IR by a compiler, as shown in step 200 of FIG. 2. For example, the GPU kernel source code may be transformed into the LLVM IR by the CLANG compiler. The CLANG compiler is a compiler front end for the C, C++, Objective-C and Objective-C++ programming languages, as well as the OpenMP, OpenCL, RenderScript and CUDA frameworks. Transforming the GPU kernel source code into IR with the CLANG compiler allows the system to be highly agnostic to both the programming language in which the GPU kernel source code is written and to the GPU architecture that executes the GPU kernel, as the CLANG compiler offers support for a wide variety of source languages and GPU architectures, and can be easily integrated with other compilation toolchains to provide additional optimizations. For example, transforming the GPU kernel source code into IR provides the flexibility to allow the system to perform additional optimizations and transformations to the GPU kernel source code in order to better implement automatic out-of-bound prevention in GPU kernels.

First Transformation—Adding Input Array Size Parameters

Figure 3:
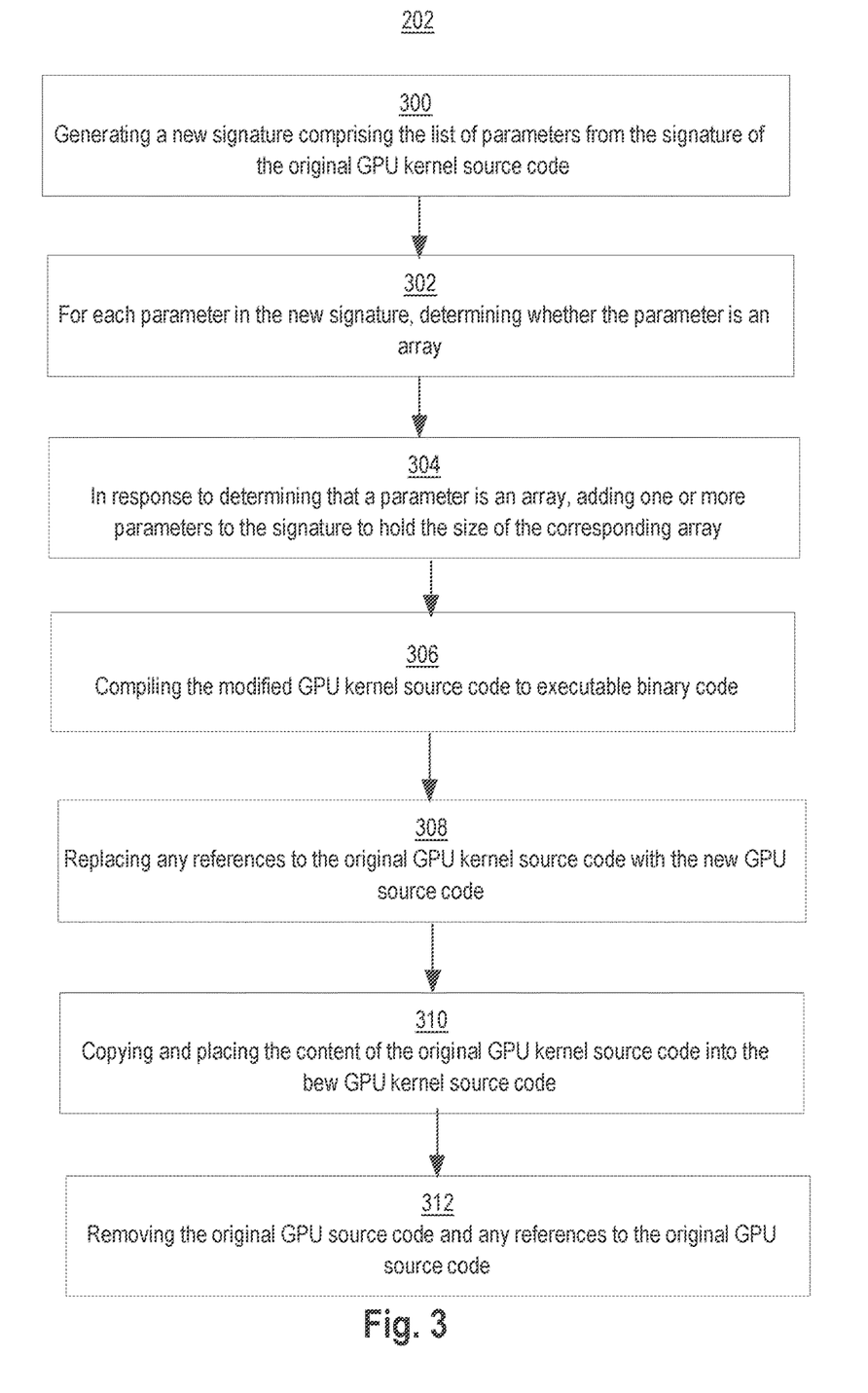
FIG. 3 illustrates an example flow diagram of a first transformation to the GPU kernel source code which may modify the GPU kernel source code to include one or more parameters to hold the sizes of input arrays, according to one embodiment.

FIG. 3 illustrates an example flow diagram of a first transformation to the GPU kernel source code, step 202 of FIG. 2, which may modify the GPU kernel source code to include one or more parameters to hold the sizes of input arrays.

An input array is an array that is provided as input to a GPU kernel, wherein the array comprises of one or more data items to be processed by the GPU. When arrays are provided as input to a GPU kernel, the value of the sizes of the input arrays may i) not be provided as input arguments to the GPU kernel, ii) be incorrect, or iii) not properly used to perform boundary checks for potential out-of-bound input array accesses. Adding out-of-bound access prevention to the GPU kernel source code requires runtime knowledge of the correct size of each input array that is accessed in the GPU kernel source code. As a consequence, the system may transform and modify the GPU kernel source code to hold additional parameters relating to the size of each input array.

In one embodiment, the original GPU kernel source code is replaced with a newly generated GPU kernel source code which comprises a modified signature to hold additional parameters relating to the size of each input array, wherein the signature of the GPU kernel code is the list of input parameters.

TABLE 2

Example pseudocode of algorithm to add size parameters to GPU kernel source code

```
Function add_array_sizes(original_kernel):
//      Step 300: Copy original signature
new_params = copy_parameters(original_kernel)
```

TABLE 2-continued

Example pseudocode of algorithm to add size
parameters to GPU kernel source code

```
//      Step 302: Add new parameter to signature
array_found = false
for param ∈ original_kernel.parameters( )
        if param.type == "array" then
            new_params.add(new Param("int"))
            array_found = true
        end
end
if     !array_found then
        return original kernel
end
//      Step 304: Create new kernel with new signature
new_kernel =
        Function(new_params, original_kernel.kernel.return_type)
//      Step 306: Replace references
update_references(original_kernel)
//      Step 308: Copy and replace content
new_kernel.take_content_from(original_kernel)
//      Step 310: Remove traces of original kernel
original_function.delete_from_code( )
return new_kernel
```

Table 2 illustrates an example algorithm that extends the input parameters within the signature of the GPU kernel source code with size parameters for each input array or pointer to input array.

At step 300 of the example algorithm, the system may generate a new signature, new_params, comprising the list of parameters from the signature of the original GPU kernel source code original_kernel. In one embodiment, prior to step 300, the system performs an additional step of identifying and retrieving the particular GPU kernel source code to be modified. At step 302, once the new signature is generated, the system may parse the new signature and inspect each parameter to determine whether the parameter is of type array. Each array parameter is associated with an input array. In some embodiments, the collection of data items that is processed by a GPU is generically referred to as type array. At step 304, in response to determining that the new signature contains at least one parameter that is of type array, or a pointer to the type array, the system may modify the new signature by adding one or more additional parameters to the new signature to hold the size of each corresponding array. If no parameter of type is found, the original GPU kernel source code is returned.

In an embodiment, as illustrated in Table 2, one or more parameters is added to the new signature. For each input array, an additional parameter may be added to the new signature, wherein each added parameter holds the size of the corresponding input array. For example, for each input array, an additional integer parameter int may be added to the new signature, where each integer parameter holds the size of the corresponding input array. In one embodiment, the added parameters which hold the sizes of the input parameters may be of any numeric data type that can represent the value of the size of an array parameter.

Alternatively, a single array parameter, or pointer to an array may be added to the new signature in response to determining that a parameter in the new signature is of type array. The size of the newly added array parameter may be equal to the number input arrays, wherein each element of the array holds the size of a corresponding input array. In one embodiment, the newly added array parameter is an unsigned integer array. In some embodiments, the order of elements in newly added array parameter is based on the order of the input array parameters presented in the new signature.

At step 306, a new GPU kernel source code, new_kernel, may be generated by the system. The new GPU kernel source code may use the newly generated signature which now contains the additional one or more parameters added in the prior step. Step 308 replaces any references to the original GPU kernel source code with references to the newly generated GPU kernel source code. At step 310, content, such as input array access instructions, from the original GPU kernel source code may be copied and placed into the newly generated GPU kernel source code. At step 312, after copying and placing the original content into the newly generated GPU kernel source code, the original GPU kernel source code, as well as any leftover references to the original GPU kernel source code, may be removed. In some embodiments, metadata associated with the newly generated GPU kernel source code is subsequently be updated. Thus, for each input array, the system may use the example algorithm in Table 2 to add one or more parameters which, at runtime, may be used to transfer to the GPU kernel information about the sizes of the input arrays.

TABLE 3

Example of a modified GPU kernel source
code with additional parameters

```
void axpy_with_sizes(float *x, float *y, float a, float *res,
int x_size, int y_size, int res_size) {
    int i = gpu_dependent_id( );
    res[i] = a * x[i] + y[i];
}
```

Table 3 illustrates an example of a GPU kernel source code with a modified signature comprising additional parameters to hold input array sizes. Specifically, Table 3 illustrates the example GPU kernel source code from Table 1 modified by the example algorithm in Table 2. Newly added parameters x_size, y_size, and res_size, hold the sizes of input arrays *x, *y, and *res, respectively. Note that in some embodiments, the system operates on the IR level of the GPU kernel source code. To simplify the understanding of the example algorithm, Table 3 illustrates an example output of the algorithm if applied at the original GPU kernel source code level.

Second Transformation—Inserting Boundary Checks

Figure 4:
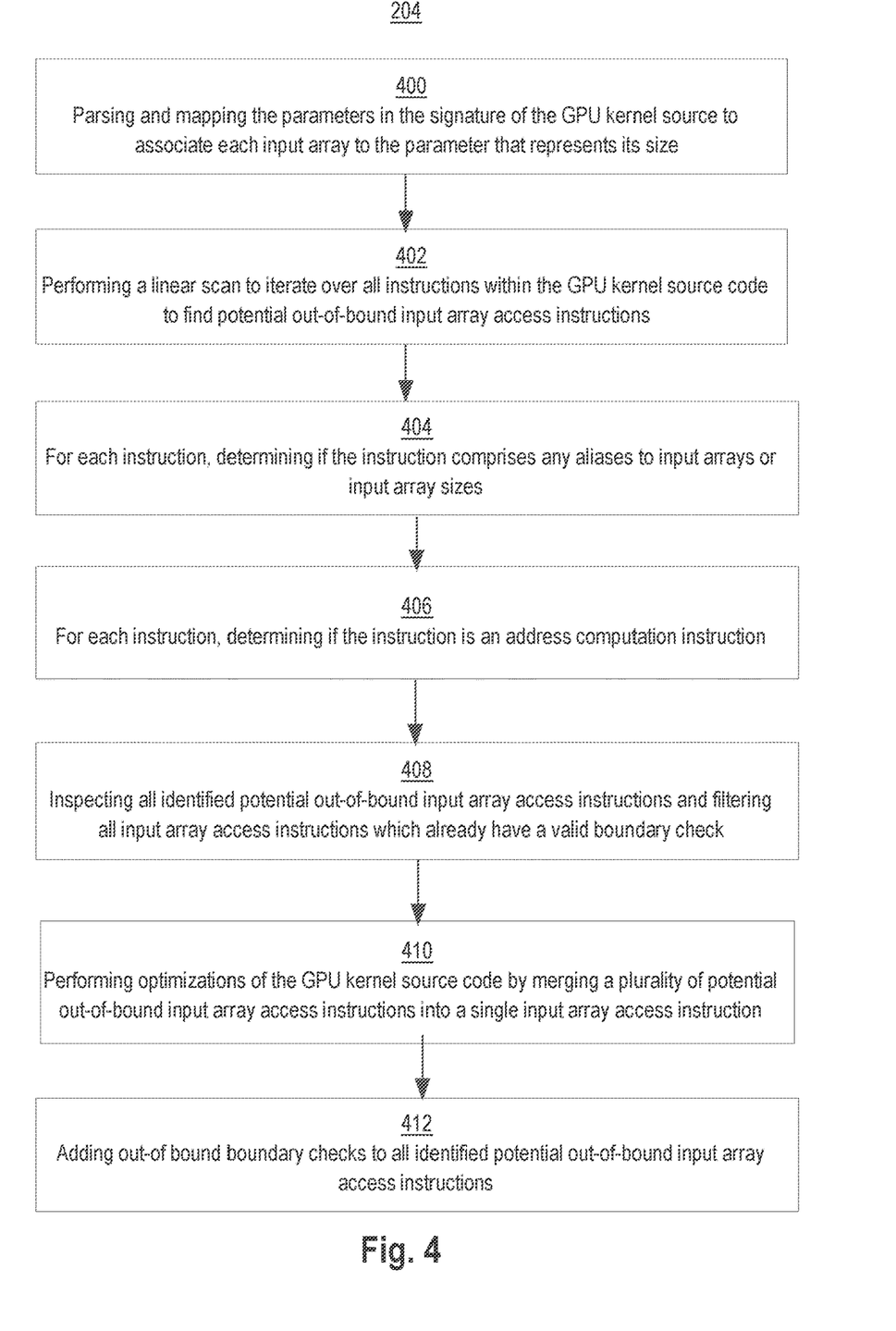
FIG. 4 illustrates an example flow diagram of a second transformation to the GPU kernel source code which may modify the GPU kernel source code to include boundary checks which protect against potential out-of-bound input array accesses, according to one embodiment.

FIG. 4 illustrates an example flow diagram of a second transformation to the GPU kernel source code, step 204 of FIG. 2, which may modify the GPU kernel source code to include boundary checks which protect against potential out-of-bound input array accesses.

Once the GPU kernel source code is modified to contain parameters that hold input array sizes, the system may perform a second transformation on the GPU kernel source code. In one embodiment, the second transformation comprises identifying where input array accesses occur in the GPU kernel source code and adding boundary checks to protect against potential out-of-bound input array accesses.

TABLE 4

Example pseudocode of algorithm to add boundary
checks to GPU kernel source code

```
Function add_boundary_checks(kernel):
    array_accesses = [ ]
    //    Step 400: Parse parameters and map input array to size
    array_size_map = parse_parameter_list(kernel)
    if array_size_map.size( ) == 0 then
        return
    end
    //    Step 402: Iterate over all instructions
    for instruction ∈ kernel.get_instruction( ) do
        // Step 404: Check for references to input arrays
        check_if_input_array_alias(instruction)
        // Step 406: Check for address computation
        if is_array_access(instruction) then
            access = handle_array_access(instruction)
            array_accesses.add(access)
        end
    end
    //    Step 408: Check for existing access protection
    filter_accesses_with_protection(array_accesses)
    //    Step 410: Merge equivalent array accesses
    simplify_array_accesses(array_accesses)
    //    Step 412: Add boundary check statements
    add_array_access_protection(array_accesses)
```

Table 4 illustrates an example algorithm that adds boundary checks to input array accesses in a GPU kernel source code. The first step of the example algorithm, step 400, comprises parsing the parameters in the signature of the GPU kernel source code to associate each input array to the parameter that represents its size. In an embodiment, an associative data structure, such as a hash-map, is used to map input arrays to the corresponding sizes. In another embodiment, additional associative data structures are used to store aliases of input arrays or input array sizes. Aliases are different symbolic names used to access data location in memory. For example, additional associative data structures may be used store a set of variables with different symbolic names that are used to access the same value associated with an input array.

At step 402, the system may perform a linear scan to iterate over all instructions within the GPU kernel source code to find potential out-of-bound input array access instructions. In an embodiment, information regarding identified potential out-of-bound array access instructions are stored in data structure. For example, in Table 4, information regarding identified potential out-of-bound array access instructions are stored in data structure array_accesses. For each instruction, the system may perform step 404, in which the system checks if the instruction comprises any aliases of input arrays or input array sizes. If so, the system may store the information regarding the aliases of input arrays or input array sizes.

At step 406, for each instruction in GPU kernel source code, the system may check whether an address computation is performed by the instruction. If an instruction represents the computation of an address, the system knows that a potential out-of-bound input array access may be performed, and may then store information regarding this access instruction in a data structure. The system may then identify i) the start of the access, ii) the end of the access, and iii) the one or more input arrays accessed starting from the address computation. For example, the system may identify a getelementptr instruction in LLVM IR as an address computation instruction which may cause an out-of-bound input array access. The start of the access may coincide with the getelementptr instruction, while the end of the access is found may be found by traversing a tree created from instructions that make use of the getelementptr instruction and looking for the leaf node in the tree, wherein a leaf node is an instruction without users of its result. For example, a store instruction in LLVM IR whose target is not accessed in subsequent parts of the GPU kernel source code is a leaf node.

In an embodiment, the system checks, for each instruction, whether the instruction is GPU-dependent. Keeping track of GPU-dependent instructions may be useful as potential out-of-bound input array accesses are often performed using GPU-dependent indices, and it may computationally advantageous to retrieve these indices efficiently. For example, instructions that depend on the identifier of the thread that is currently being executed by a GPU, such as gpu_dependent_id ( ) in Table 1 and Table 3, are GPU-dependent instructions which may cause out-of-bound input array accesses.

At step 408, the system may inspect all potential out-of-bound input array accesses, and filter all input array accesses which already contain a valid form of boundary check. To perform this filtering, the system may check if the start and end of the input array access are enclosed in a conditional statement equivalent to the boundary check that the current system would add. If such a conditional statement is present, additional boundary checks will not be added.

The second transformation of the GPU kernel source code may also apply optimizations to the GPU kernel source code to ensure the minimum number of out-of-bound boundary checks are performed. In one embodiment, the number of out-of-bound boundary checks is reduced by merging a plurality of potential out-of-bound input array accesses into a single input array access. At step 410, the system may perform optimizations to the GPU kernel source code by identifying potential out-of-bound input array accesses that have the same size or have start/end instructions that coincide. In an example where the plurality of potential out-of-bound input array accesses have the same size, the system may compute the boundary check only once, and the computed boundary check is used to prevent potential out-of-bound input array access for the plurality of potential out-of-bound input array accesses. In an example where the plurality of out-of-bound input array accesses have start and end instructions that coincide, the computed boundary checks may be concatenated together with a sequence of Boolean AND operations. In the example algorithm in Table 4, the boundary checks may be simplified prior to being added to the GPU kernel source code.

At step 412, the system may add out-of-bound boundary checks to all identified potential out-of-bound input array accesses. The system may perform this step by embodying a set of potential out-of-bound input array accesses inside a conditional block that is executed only if the index used to access the input array lies in the valid size of the input array. In an embodiment, identical boundary checks identified in the previous step may be merged into a single boundary check.

TABLE 5

Example of a modified GPU kernel source
code with unsimplified boundary checks

```
void axpy_with_unsimplified_checks(float *x, float *y, float a,
float *res, int x_size, int y_size, int res_size) {
    int i = gpu_dependent_id( );
    if (i < x_size) {
        float x_i = x [i];
        if (i < y_size) {
            float y_i = y[i];
            if (i < res_size) {
                res[i] = a * x_i + y_i;
            }
        }
    }
}
```

TABLE 6

Example of a modified GPU kernel source
code with simplified boundary checks

```
void axpy_with_simplified_checks(float *x, float *y, float a,
float *res, int x_size, int y_size, int res_size) {
    int i = gpu_dependent_id( );
    if (i < x_size && i < y_size && i < res_size) {
        float x_i = x[i];
        float y_i = y[i];
        res[i] = a * x_i + y_i;
    }
}
```

Table 5 and Table 6 illustrate examples of GPU kernel source codes modified with boundary checks to prevent out-of-bound input accesses. Specifically, Table 5 and 6 illustrate the example modified GPU kernel source code from Table 3 further modified by the example algorithm in Table 4. In Table 5, potential out-of-bound input array access instructions float $x\_i=x[i]$, float $y\_i=y[i]$, and $res[i]=a*x\_i+y\_i$, are embodied inside conditional blocks that are only executed if the indexed i used to access the input arrays is less than the valid input array sizes x_size, y_size, and res_size, respectively. In Table 6, the identical boundary checks from Table 5 are merged into a single boundary check with a sequence of Boolean AND operations.

Note that in some embodiments, the system operates on the IR level of the GPU kernel source code. To simplify the understanding of the example algorithm, Table 5 and Table 6 illustrate example outputs of the algorithm if applied at the original GPU kernel source code level.

Invoking the GPU Kernel in a Polyglot Virtual Machine

The modified GPU kernel source code may be compiled to executable binary code prior to being invoked in a polyglot VM. In an embodiment, the modified GPU kernel source code is a modified IR. In some embodiments, the modified GPU kernel source code is compiled first to assembly code prior to being compiled to executable binary.

The executable binary code of the modified GPU kernel source code may be loaded inside a polyglot VM which allows a user to use an arbitrary language to interact with the GPU kernel. In an embodiment, the polyglot VM automatically converts input and output data from their original format to the format suitable for the GPU kernel. For example, the system may load the modified GPU kernel source code in the GraalVM polyglot VM. In one embodiment, GraalVM is used with the grCUDA environment to invoke CUDA GPU kernels compiled in advance. A user may load and call the modified GPU kernel source code in the polyglot VM using a host language of the user's choice inside the grCUDA environment. Using GraalVM makes information about the input array sizes readily available to the GPU kernel. The system may then use GraalVM to hide from the user the need to specify the sizes of input arrays to the GPU kernel. In an embodiment, the host source code may be modified within GraalVM such that input array sizes are inferred automatically and transmitted to the GPU kernel when the user calls it.

TABLE 7

Example of host source code used to invoke
the GPU kernel in a polyglot VM

```
size=1000; a=2.0
# Allocate arrays on both CPU and GPU
x=                  polyglot.eval(language="cuda",
                    string=f"float[{size}]")
y=                  polyglot.eval(language="cuda",
                    string=f"float[{size}]")
res                 = polyglot.eval(language="cuda",
                    string=f"float[{size}]")
# Initialize arrays with some sample value
for i in range(size):
            x[i]=i; y[i]=i;res[i]=0
# Signature of the GPU kernel
params = "pointer, pointer, float, pointer"
code = f"bindkernel('axpy.cubin', 'axpy', '{params}')"
# Load the GPU kernel
kernel = polyglot.eval(language="cuda", string=code)
# Kernel input values
params = [x, y, a, res]
# GPU architecture-dependent parameters
num_threads = 128
num_blocks = (size + num_threads − 1) // num_threads
# Invoke the kernel
kernel(num_blocks, num_threads)(*params)
```

Table 7 illustrates an example host source code, in Python, used to load and call the modified GPU kernel source code in a polyglot VM. The example host source code does not require manual transmission of the sizes of each input array. The sizes are inferred automatically and transmitted to the GPU kernel when it is called. For example, in Table 7, the actual GPU kernel input values are expressed as params=[x, y, a, res]. Note that in the example host source code, the parameters holding the sizes of input arrays x, y, and res may be hidden from the user. If automatic inference of input array sizes were not available, the actual GPU kernel input values may need to be manually expressed as params=[x, y, a, res, len (x), len (y), len (res)], with additional parameters len (x), len (y), and len (res) holding the input array sizes of x, y, and res respectively.

Differences and Advantages

A difference from the prior industry solutions for GPU out-of-bound access prevention is that the embodiments described herein automatically adds out-of-bound protections to the GPU kernel source code.

The embodiments described herein are able to automatically identify and prevent out-of-bound array access in GPU kernels by transforming the GPU kernel source code at compile time, adding information about input array sizes, and enhancing the GPU kernel source code with boundary checks.

The polyglot runtime execution environment transparently provides GPU kernels with information about the size of input arrays which is known only at runtime. Compared to existing techniques, the end-user does not need to manually provide the size of input arrays to the GPU kernel, as the runtime environment takes care of this step automatically with no overhead or any other negative impact on the execution time of the GPU kernels. Thus, due to the robustness and flexibility of the embodiments described herein, they may be easily adopted for many applications in a variety of fields.

Information about input array sizes may be provided to GPU kernels invoked at runtime through high-level languages, such as Python. This approach greatly extends the flexibility of GPU acceleration and makes it readily available to data scientists and engineers who might be unwilling to deploy GPU-based solutions without having the robustness provided by high-level languages. With the embodiments described herein, programmers may focus on GPU acceleration without dealing with hard-to-detect bugs introduced by out-of-bound boundary accesses, vastly improving productivity.

Software Overview

Figure 5:
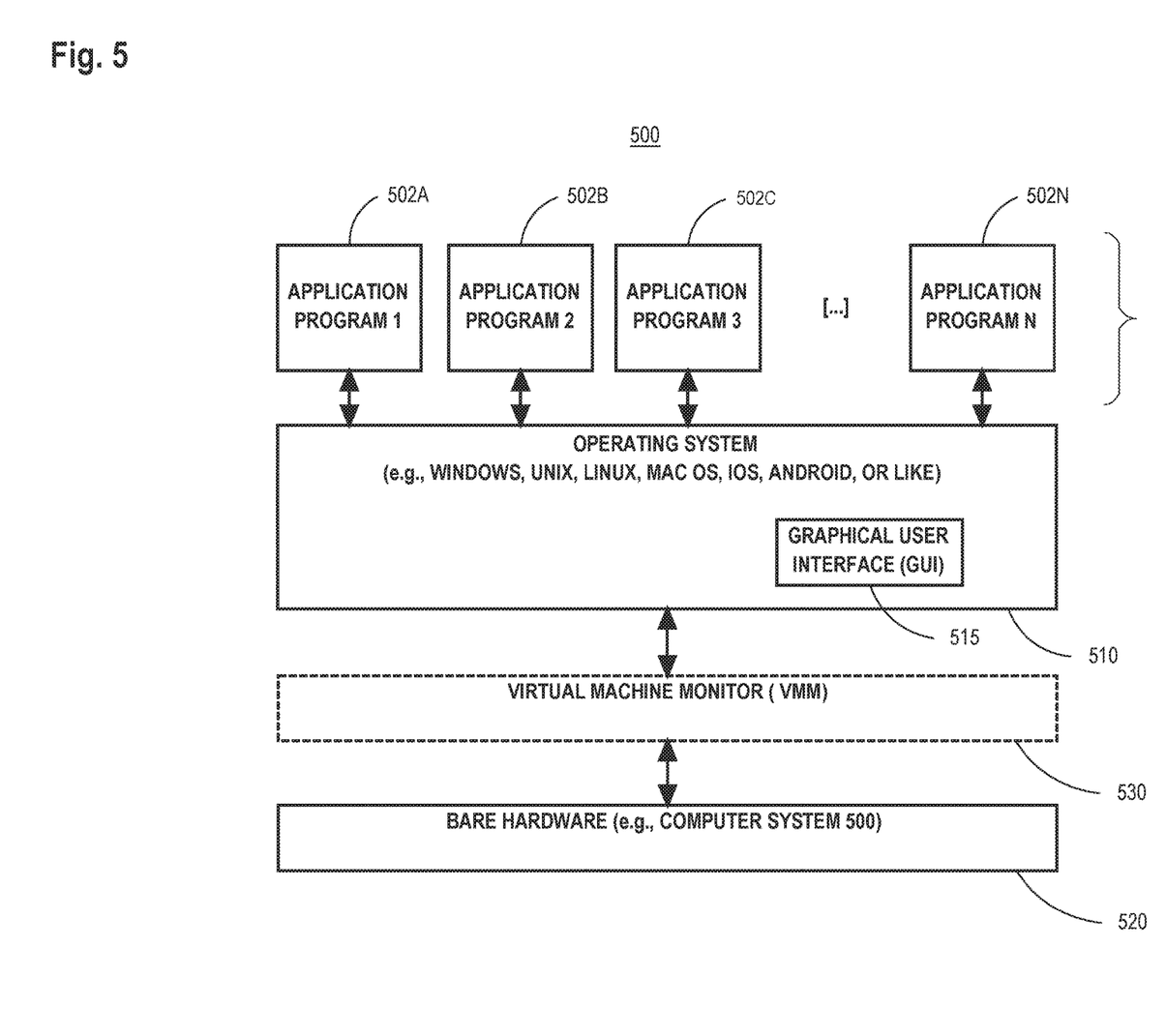
FIG. 5 illustrates a block diagram of a basic software system for controlling the operation of a computing device.
Figure 6:
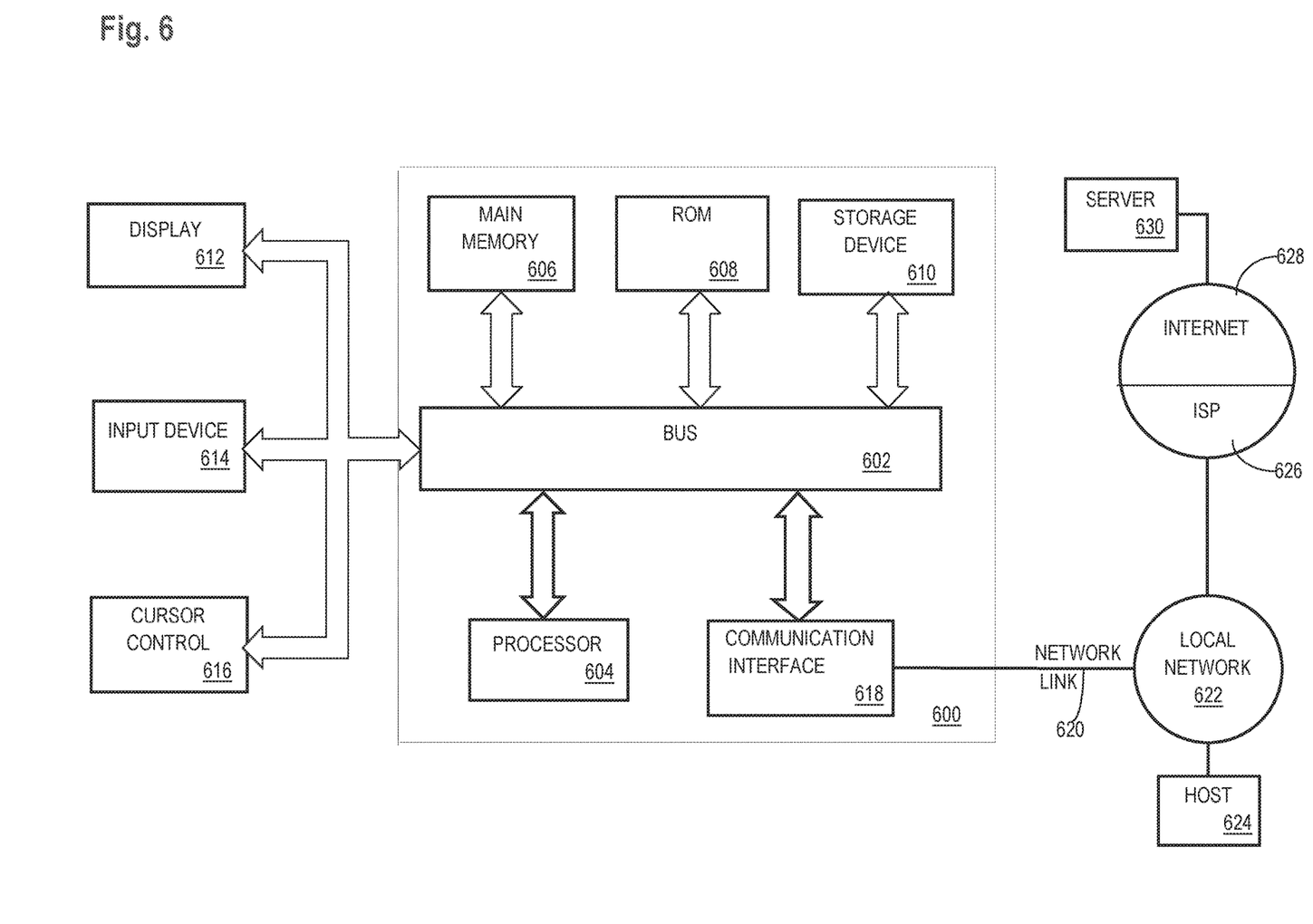
FIG. 6 illustrates a block diagram of a computing device in which the example embodiment(s) of the present invention may be embodiment.

FIG. 5 is a block diagram of a software system 500 that may be employed for controlling the operation of computer system 600. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 600. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 600. The applications or other software intended for use on system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of system 500. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method comprising:
compiling a graphics processing unit (GPU) kernel code function that includes one or more array references that are memory address dependent, wherein said compiling includes:
i) generating a rewritten GPU kernel code module that includes, within a function signature of said rewritten GPU kernel code module, a respective array size parameter for each array reference of said one or more array references that are memory address dependent; and
ii) adding, to said rewritten GPU kernel code module, bounding protection instructions to one or more potential out-of-bound access instructions, wherein said one or more potential out-of-bound access instructions comprise instructions that reference each respective array size parameter for each array reference of said one or more array references that are memory address dependent; and
loading said rewritten GPU kernel code module in a virtual machine, wherein loading comprises modifying a host application source code to automatically transmit, from said host application, one or more input array size values that is referenced by said one or more potential out-of-bound access instructions.

2. The method of claim 1, wherein said respective array size parameter for each array reference of said one or more array references that are memory address dependent is an element of an array data structure parameter that is within said function signature of said rewritten GPU kernel code module.

3. The method of claim 1, wherein loading said rewritten GPU kernel code module in said virtual machine further comprises performing a call, using a host application language, to invoke said rewritten GPU kernel code module.

4. The method of claim 1, wherein said bounding protection instructions comprise:
embodying said one or more potential out-of-bound access instructions inside a conditional block, wherein execution of said conditional block is dependent on a GPU-dependent index value, and wherein said one or more potential out-of-bound access instructions inside said conditional block is executed only if said GPU-dependent index value is less than each respective array size parameter for each array reference of said one or more array references that are memory address dependent.

5. The method of claim 1, wherein said GPU kernel code function comprises a Low Level Virtual Machine (LLVM) intermediate representation (IR).

6. The method of claim 1, further comprising:
associating said respective array size parameter for each array reference with each array reference of said one or more array references that are memory address dependent using one or more associative data structures.

7. The method of claim 4, wherein said GPU-dependent index value is dependent on an identifier of a thread that is executed by a GPU.

8. The method of claim 1, further comprising:
using a compiler, transforming said rewritten GPU kernel code module into executable binary code.

9. The method of claim 1, wherein said one or more potential out-of-bound access instructions further comprise instructions that contain aliases of said one or more array references that are memory address dependent.

10. The method of claim 1, wherein said one or more potential out-of-bound access instructions further comprise instructions that contain aliases of each respective array size parameter for each array reference of said one or more array references that are memory address dependent.

11. One or more non-transitory computer-readable storage media storing instructions which, when executed by one or more processors, cause:
compiling a graphics processing unit (GPU) kernel code function that includes one or more array references that are memory address dependent, wherein said compiling includes:
i) generating a rewritten GPU kernel code module that includes, within a function signature of said rewritten GPU kernel code module, a respective array size parameter for each array reference of said one or more array references that are memory address dependent; and
ii) adding, to said rewritten GPU kernel code module, bounding protection instructions to one or more potential out-of-bound access instructions, wherein said one or more potential out-of-bound access instructions comprise instructions that reference each respective array size parameter for each array reference of said one or more array references that are memory address dependent; and
loading said rewritten GPU kernel code module in a virtual machine, wherein loading comprises modifying a host application source code to automatically transmit, from said host application, one or more input array size values that is referenced by said one or more potential out-of-bound access instructions.

12. The one or more non-transitory computer-readable storage media of claim 11, wherein said respective array size parameter for each array reference of said one or more array references that are memory address dependent is an element of an array data structure parameter that is within said function signature of said rewritten GPU kernel code module.

13. The one or more non-transitory computer-readable storage media of claim 11, wherein loading said rewritten GPU kernel code module in said virtual machine further comprises performing a call, using a host application language, to invoke said rewritten GPU kernel code module.

14. The one or more non-transitory computer-readable storage media of claim 11, wherein said bounding protection instructions comprise:
embodying said one or more potential out-of-bound access instructions inside a conditional block, wherein execution of said conditional block is dependent on a GPU-dependent index value, and wherein said one or more potential out-of-bound access instructions inside said conditional block is executed only if said GPU-dependent index value is less than each respective array size parameter for each array reference of said one or more array references that are memory address dependent.

15. The one or more non-transitory computer-readable storage media of claim 11, wherein said GPU kernel code function comprises a Low Level Virtual Machine (LLVM) intermediate representation (IR).

16. The one or more non-transitory computer-readable storage media of claim 11, further comprising instructions which, when executed by the one or more processors, cause:
    associating said respective array size parameter for each array reference with each array reference of said one or more array references that are memory address dependent using one or more associative data structures.

17. The one or more non-transitory computer-readable storage media of claim 14, wherein said GPU-dependent index value is dependent on an identifier of a thread that is executed by a GPU.

18. The one or more non-transitory computer-readable storage media of claim 11, further comprising instructions which, when executed by the one or more processors, cause:
    using a compiler, transforming said rewritten GPU kernel code module into executable binary code.

19. The one or more non-transitory computer-readable storage media of claim 11, wherein said one or more potential out-of-bound access instructions further comprise instructions that contain aliases of said one or more array references that are memory address dependent.

20. The one or more non-transitory computer-readable storage media of claim 11, wherein said one or more potential out-of-bound access instructions further comprise instructions that contain aliases of each respective array size parameter for each array reference of said one or more array references that are memory address dependent.

* * * * *

UNITED STATES PATENT AND TRADEMARK OFFICE
CERTIFICATE OF CORRECTION

Page 1 of 2

PATENT NO. : 11,288,108 B2
APPLICATION NO. : 16/701797
DATED : March 29, 2022
INVENTOR(S) : Parravicini et al.

It is certified that error appears in the above-identified patent and that said Letters Patent is hereby corrected as shown below:

On the Title Page

On page 2, Column 2, Item (56) under Other Publications, Line 9, delete "Sccesses" and insert -- Successes --, therefor.

On page 2, Column 2, Item (56) under Other Publications, Line 14, delete "M<ethod" and insert -- Method --, therefor.

On page 2, Column 2, Item (56) under Other Publications, Line 17, delete "AH"." and insert -- All". --, therefor.

On page 2, Column 2, Item (56) under Other Publications, Line 37, delete "et et al." and insert -- et al. --, therefor.

On page 2, Column 2, Item (56) under Other Publications, Line 56, delete "NVDIA" and insert -- NVIDIA --, therefor.

On page 2, Column 2, Item (56) under Other Publications, Line 69, delete "https://nivida.custhelp.com" and insert -- https://nvidia.custhelp.com --, therefor.

In the Drawings

On sheet 3 of 6, in FIG. 3, under Reference Numeral 310, Line 2, delete "bew" and insert -- new --, therefor.

On sheet 4 of 6, in FIG. 4, under Reference Numeral 412, Line 1, delete "out-of bound" and insert -- out-of-bound --, therefor.

On sheet 5 of 6, in FIG. 5, under Reference Numeral 530, Line 1, delete "( VMM)" and insert -- (VMM) --, therefor.

Signed and Sealed this
Sixteenth Day of August, 2022

Katherine Kelly Vidal
*Director of the United States Patent and Trademark Office*

In the Specification

In Column 4, Lines 11-12, delete " $\lceil 1000/1281=8 \rceil$ " and insert -- $\lceil 1000/128 \rceil = 8$ --, therefor.

In Column 6, Line 2, delete "*r e s," and insert -- *res, --, therefor.